(No Model.)

F. F. LANDIS.
CENTRIFUGAL GRAIN SEPARATOR.

No. 551,497. Patented Dec. 17, 1895.

Witnesses
Edward P. Schwartz
George H. Bliss

Inventor
Frank F. Landis.
By Attorney Herbert W. T. Jenner.

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Letters Patent No. 551,497, dated December 17, 1895.

Application filed August 20, 1895. Serial No. 559,935. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Grain-Separators; and I do hereby declare the following to be a full, clear, and exact description of the invention, such as will enable others skilled in the art to which it appertains to make and use the same.

This invention relates to centrifugal grain-separators, and it consists in the novel construction and combination of the parts hereinafter fully described and claimed.

Figure 1:
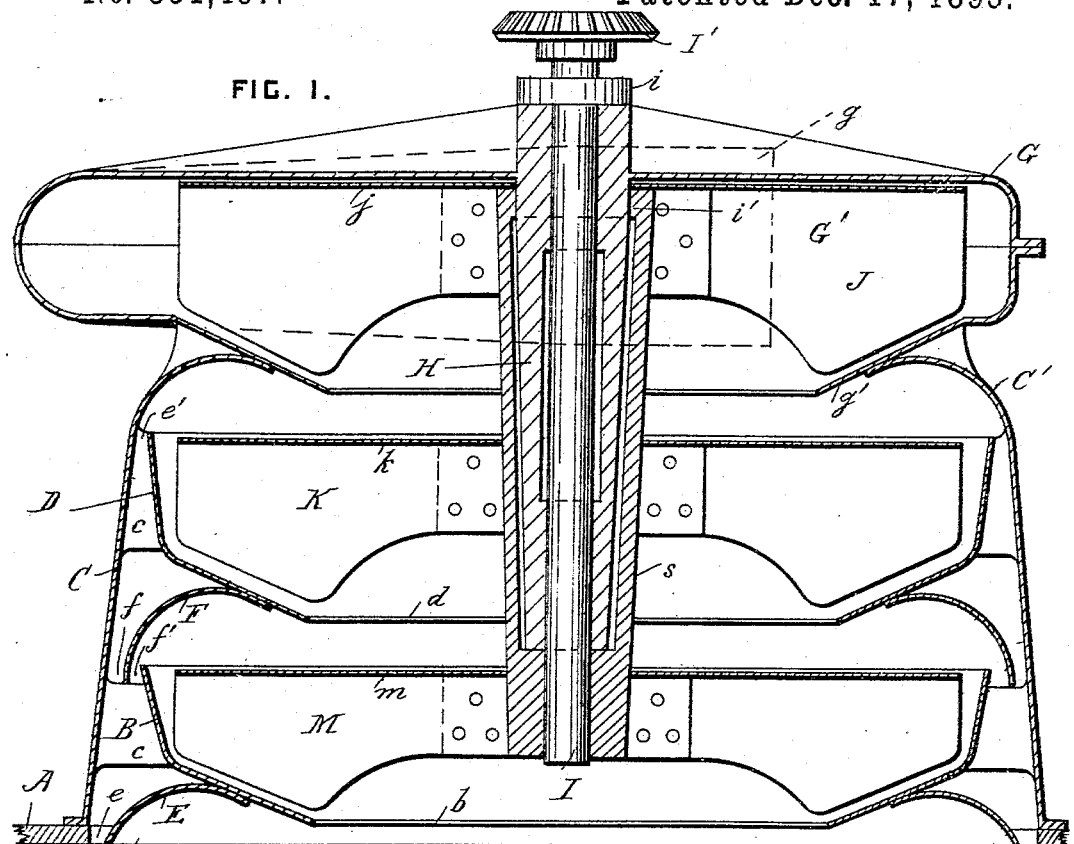
Figure 2:
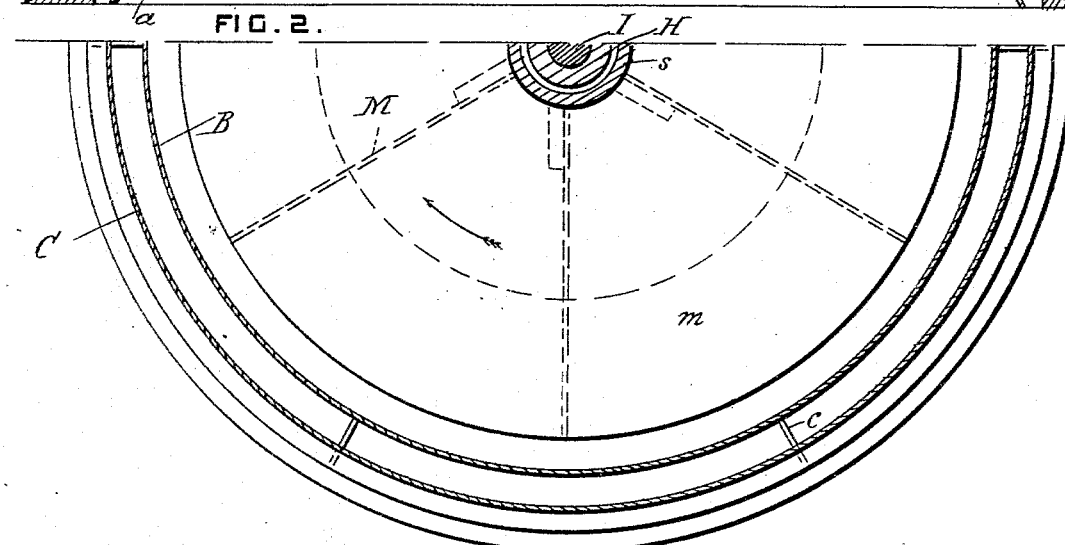

In the drawings, Figure 1 is a vertical section through the grain-separator. Fig. 2 is a partial sectional plan view of the same.

A is a base-plate provided with an inlet-opening $a$.

B is a pan having upwardly-flaring sides, supported above the plate A, and having an opening $b$ at its lower part.

C is the casing of the machine, preferably slightly conical in form, and secured to the plate A around the opening $a$.

D is a pan having upwardly-flaring sides, supported above the pan B, and having an opening $d$ at its lower part. The pan D is deeper than the pan B, and $c$ are brackets which secure the said pans to the casing C. The upper part C' of the casing C is curved inwardly over the edge of the pan D.

E is a concave ring secured under the pan B, leaving an annular air-inlet space $e$ between it and the edge of the opening in the base-plate A.

F is a concave ring secured under the pan D, leaving an annular space $f$ between it and the casing C and a second annular space $f'$ between it and the upper edge of the pan B. An annular space $e'$ is also formed between the casing C and the upper edge of the pan D.

G is the casing of the discharger G' secured on top of the casing C, and preferably provided with a conical throat-piece $g'$ communicating with the top of the said casing.

H is a long bearing formed integral with, or otherwise secured to, the casing G, and depending centrally within the casing C. The discharger-casing has its periphery formed on a volute curve, and is provided with a delivery-pipe $g$.

I is a shaft journaled in the bearing H, and provided with a collar $i$ resting on the upper end of the said bearing.

I' is a wheel or pulley secured on the shaft I and affording a means for revolving it. A long hub $s$ is secured to the lower part of the shaft I, and is provided with a bearing $i'$ journaled in the upper part of the bearing H.

J are the radial arms of the discharger arranged in the discharger-casing and secured on the upper part of the hub $s$. The series of arms J have a disk $j$ secured to their upper edges.

K are radial arms secured to the hub $s$ and arranged in the pan D. These arms K have a disk $k$ secured to their upper edges.

M are radial arms secured on the hub $s$, arranged in the pan B, and provided with a disk $m$ secured to their upper edges.

The areas of the arms M, K, and J increase in a regular proportion. The area of the arms M is arranged so that the arms will draw a certain volume of air through the opening $b$. The area of the arms K is as much greater than the area of the arms M as will enable the arms K to dispose of all the air drawn upward by the arms M, and draw a sharp current of air through the annular opening or space $f'$. The area of the arms J is as much greater than the area of the arms K as will enable the arms J to dispose of all the air driven upward by the arms K, and draw a sharp current of air through the annular space $e'$.

The straw, after passing through a thrashing-machine of any approved construction and having most of the grains removed from it, is conducted to the opening $a$. The radial arms, which are caused to revolve rapidly, draw a current of air upwardly through the machine. The straw is drawn into the pan B, and is whirled around therein by the arms M. The grains are driven out of the straw by centrifugal force, and rise up the flaring sides of the pan. The grains fall over the upper edge of the pan B down the opening $f'$. The chaff does not fall down this opening because of the current of air drawn upwardly through it by the arms K. The concave ring F turns over the straw at the top of the pan B and causes the grains to fall out of it. The straw is then drawn upward by the current of air and is whirled around in the pan D by the arms J. Any grains remaining in the straw are driven out and fall down the passage $e'$ against the current of air drawn upwardly through it by the discharger. Any grains which fall upon the disks $j$ or $m$ are driven off by centrifugal force, and pass down the air-passages at the periphery of the outer casing. The straw is again turned over at the top of the pan D by the curved upper portion $C'$ of the casing C. The straw is then drawn into the discharger-casing, and is discharged through the delivery-pipe by the revolving arms of the discharger.

What I claim is—

1. The combination, with an outer casing, and a pan supported therein and provided with upwardly flaring sides, a straw inlet opening at its bottom, and an annular passage between its upper edge and the said casing; of a discharger casing supported above the said casing, a revoluble discharger provided with a disk and radial arms and arranged in the discharger casing, and a disk and radial arms of less area than the discharger arms, revolving with the said discharger arms and arranged in the said pan, substantially as set forth.

2. The combination, with an outer casing having an inwardly curved portion at its top, and a pan supported in the said casing and provided with upwardly flaring sides, an inlet opening at its bottom, and an annular passage between its upper edge and the said casing; of a discharger casing provided with a conical throat piece joining onto the said curved portion of the casing, and a revoluble discharger and revoluble arms connected together and arranged in the said discharger casing and pan respectively, substantially as set forth.

3. The combination, with an outer casing, and pans supported therein one above the other and provided with upwardly flaring sides, straw inlet openings at their bottoms, and air passages between their upper edges and the said casing; of means for whirling around the straw in the said pans, and a centrifugal straw discharger supported above the said casing and operating to remove the straw and chaff from the said pans, substantially as set forth.

4. The combination, with the outer casing, the two pans supported therein and provided with upwardly flaring sides and openings at their bottoms, and the concave ring secured to the upper pan and forming passages $f$ and $f'$ around the lower pan, a passage $e'$ being formed between the upper pan and the casing; of means for whirling around the straw in the said pans, and a centrifugal straw discharger supported above the said casing and operating to remove the straw and chaff therefrom, substantially as set forth.

5. The combination, with the outer casing, and pans supported therein and provided with upwardly flaring sides, straw inlet openings at their bottoms, and air passages between their upper edges and the said casing; of a discharger casing arranged above the said casing and provided with a long central bearing, a discharger provided with a long hub secured upon the lower part of the said shaft, encircling the said bearing and having radial arms on its upper part inside the discharger casing; and radial arms and disks secured to the said hub inside the respective pans, substantially as set forth.

6. A centrifugal grain cleaner comprising in its construction, series of revoluble arms provided with disks, said series of arms being arranged one above the other and increasing proportionally in area, each said series of arms operating to receive the straw from the arms next below it and to produce a current of air for winnowing the grains driven off by the arms next below it, and casings inclosing the said arms and provided with air passages, and upwardly flaring pans encircling the lower series of arms, substantially as set forth.

In testimony whereof I affix my signature in presence of two witnesses.

FRANK F. LANDIS.

Witnesses:
ALF. N. RUSSELL,
GEO. H. RUSSELL.